Dec. 29, 1953
B. A. WELLS
2,663,992
AIRCRAFT POWER PLANT CONTROL APPARATUS
Filed Nov. 30, 1949
2 Sheets-Sheet 1
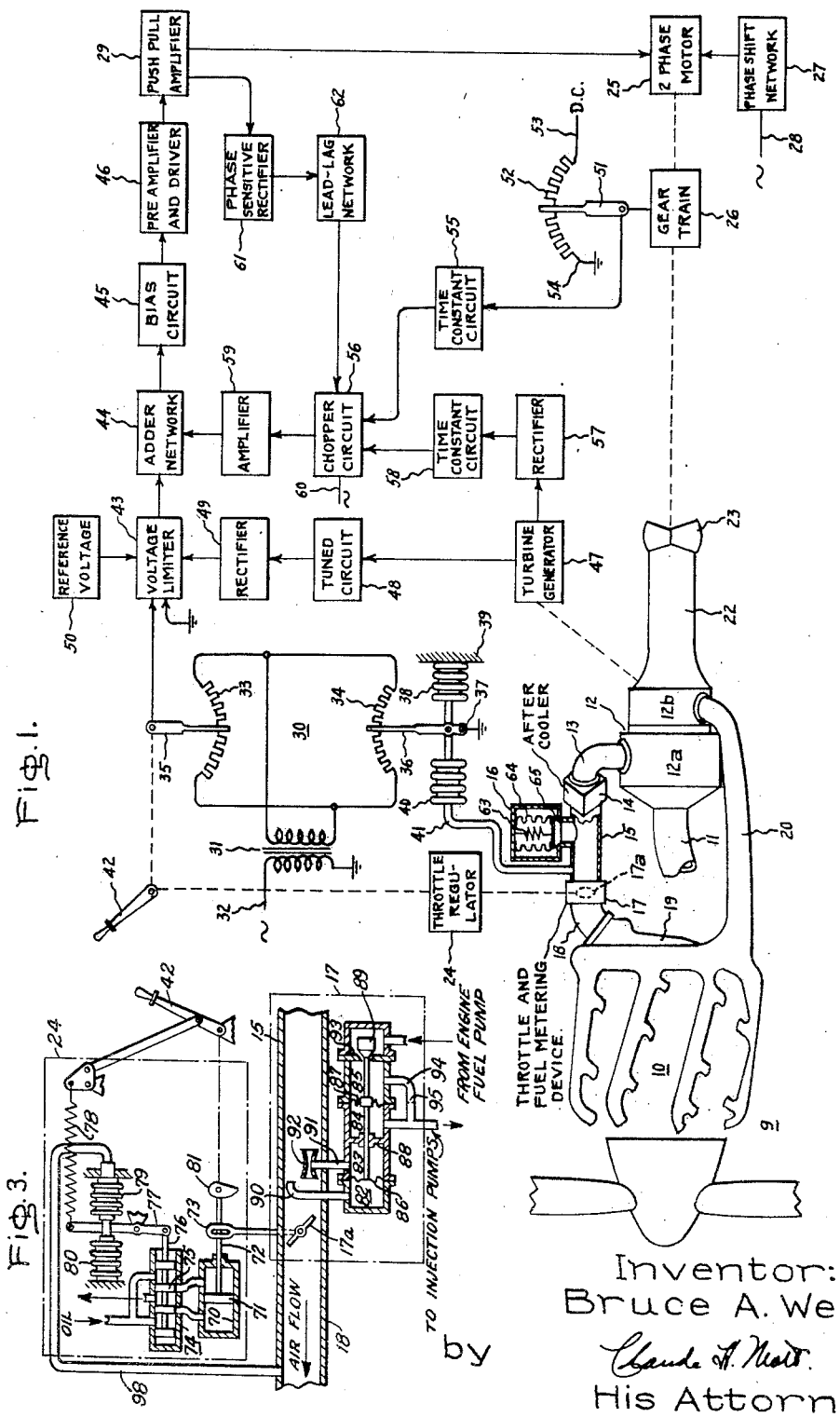
Inventor:
Bruce A. Wells,
by Claude A. Mott.
His Attorney.

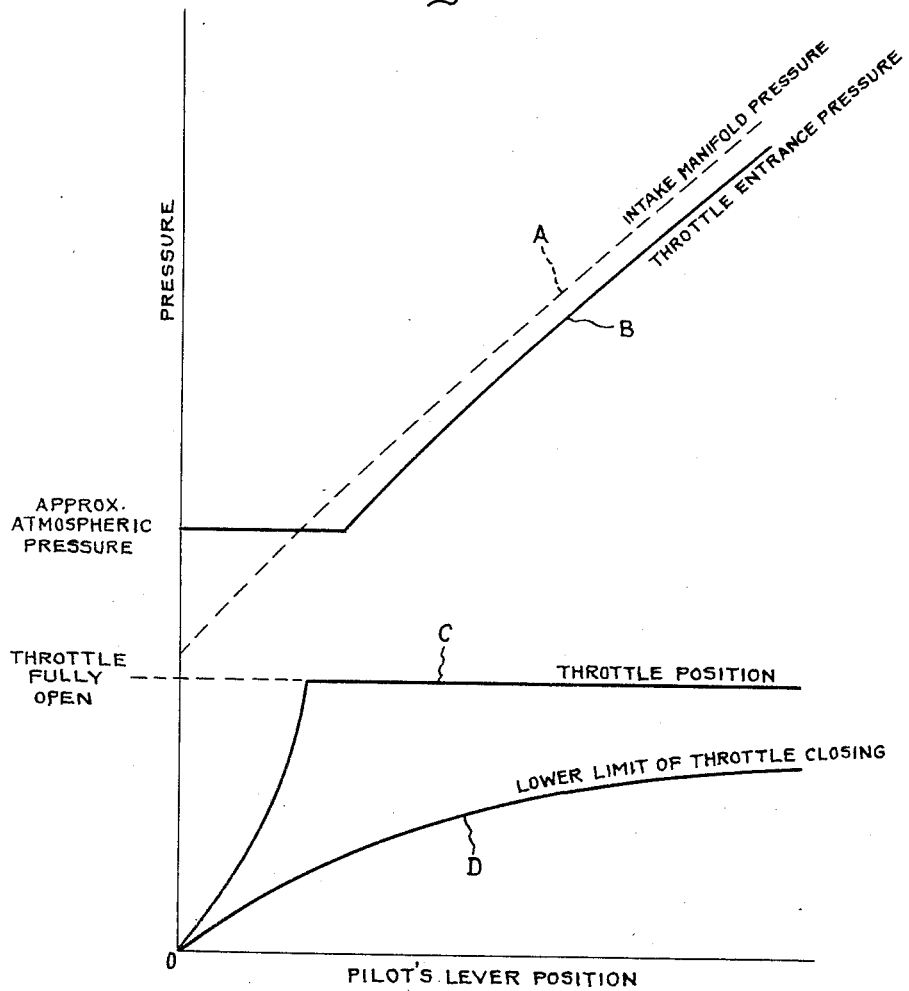

Patented Dec. 29, 1953

2,663,992

UNITED STATES PATENT OFFICE 2,663,992

AIRCRAFT POWER PLANT CONTROL APPARATUS

Bruce A. Wells, Schenectady, N. Y., assignor to General Electric Company, a corporation of New York Application November 30, 1949, Serial No. 130,097

6 Claims. (Cl. 60—35.6)

1

This invention relates to control systems for internal combustion engines having exhaust driven turbosuperchargers, and more particularly to control systems for power plants formed by the combination with a reciprocating engine of a turbosupercharger having a variable exhaust nozzle to provide supplementary jet thrust.

The principal object of my invention is the provision of an improved control system for such a power plant.

Another object of my invention is to provide a control system for a supercharged internal combustion engine having only a turbosupercharger to provide air for supporting combustion in the engine; that is, for an engine having no gear driven supercharger to supplement the turbosupercharger.

Another object of the invention is to provide a control system for an internal combustion engine and a turbosupercharger which is operable by a single control lever.

A further object of the invention is the provision of improved means for limiting the output pressure of a turbosupercharger.

A still further object of my invention is to provide improved stabilizing means for a power plant control system.

In carrying out my invention in one form, I provide an aircraft power plant comprising a turbosupercharger connected to a reciprocating internal combustion engine in such a manner that all of the exhaust gases from the reciprocating engine pass through the turbine of the turbosupercharger. From the turbine, the exhaust gases pass through a variable discharge propulsion nozzle which controls the flow of these exhaust gases, the discharge of the gases from the nozzle providing a jet thrust to supplement the action of the reciprocating engine in turning a propeller. The compressor of the turbosupercharger is connected to the intake manifold of the reciprocating engine through a throttle and fuel metering device. The throttle and fuel metering device is operated by a throttle regulator which is controlled by a control lever. The same control lever also provides for the insertion of signals into a stabilized electronic boost control circuit which automatically governs the position of the variable discharge nozzle to maintain the air pressure at the throttle inlet at a value corresponding to the position of the control lever. Thus, a single lever provides complete control of the operation of the power plant.

For a clearer and more complete understanding of my invention, reference should be had to the accompanying drawing in which Fig. 1 is a schematic representation of a power plant and a single lever control system for the regulation thereof embodying the present invention in a preferred form; Fig. 2 includes a group of curves to aid in the understanding of the operation of my single lever control system; while Fig. 3 shows a typical fuel metering device and an hydraulically operated throttle regulator which may be employed in conjunction with my control apparatus.

Referring to Fig. 1 of the drawing, there is shown schematically a power plant 9 which may be the power plant of an aircraft. The power plant comprises a reciprocating internal combustion engine 10 provided with an exhaust gas driven turbosupercharger 12 and a variable exit nozzle 23 for the exhaust gases.

Air for supporting combustion in the internal combustion engine 10 passes into an intake duct 11, then into the compressor 12a of the supercharger 12 where it is compressed, through a duct 13, an induction air cooler 14 where the temperature of the compressed air leaving the supercharger is reduced, through a duct 15 past a relief valve 16, through a throttle and fuel metering device 17 in which a throttle valve 17a is located, through a duct 18 into intake manifold 19 and thence into the engine 10.

The exhaust gases from engine 10 pass through an exhaust manifold 20, through the turbine portion 12b of turbosupercharger 12, through an outlet duct 22 and then through a variable discharge nozzle or valve 23 into the atmosphere. The exhaust gases from conduit 22 and nozzle 23 are directed in a rearward direction relative to the flight path of the aircraft so that the reaction force resulting from discharging these gases at high velocity produces a forward thrust on the aircraft.

The present invention is adaptable primarily to internal combustion engines of the direct injection type because of the absence of a gear driven supercharger in the air intake system between the throttle and the intake manifold. If such a gear driven supercharger is present, a conventional aircraft type carburetor can be used because of the mixing action of air and fuel provided by the gear driven supercharger, but in the absence of the gear driven supercharger, direct injection is ordinarily required to assure proper proportioning of the fuel among the cylinders of the internal combustion engine. The throttle and fuel metering device 17 provides means responsive to the flow of air through the throttle valve 17a for varying the amount of fuel injected into the cylinders, the device operating responsively to the weight of air flow through the throttle valve in a well known manner to properly proportion the mixture of fuel and air. A typical device suitable for this purpose is described hereinafter and illustrated in Fig. 3 of the drawing. The throttle and fuel metering device 17 is operated by a throttle regulator 24 which may also be of any well known type. Such throttle regulators are commonly operated by hydraulic means, although other types are known. A typical hydraulically operated throttle regulator is described hereinafter and illustrated in Fig. 3. The operation of relief valve 16 and its effect on the pressure in the air supply duct between the turbosupercharger and the engine is also explained subsequently.

The variable discharge nozzle 23 includes adjusting eyelids which are driven by an alternating current motor 25 through a gear train indicated schematically at 26. The motor 25 may be of the two phase reversible induction type which operates in response to current flowing through one of two field windings, the current of one winding being displaced by 90 degrees in phase relation with the current in the other phase by a phase shifting network 27. Such a motor is well known. The network 27 is energized by a cable at 28 connected to the airplane's source of power which may, for example, be 400 cycle alternating current. Motor 25 is energized by a voltage from a push-pull amplifier 29, the circuit operation of which is hereinafter described in greater detail.

In the present arrangement, all of the exhaust gases from engine 10 flow through turbine 12b and are discharged through variable discharge nozzle 23 to the atmosphere. The speed of turbine 12b and, hence, the output of the combined reciprocating and jet power plant, may be varied by varying the position of the eyelids of nozzle 23 to increase or decrease the ratio of pressure in exhaust manifold 20 to the pressure in duct 22. It will be readily understood by those skilled in the art that varying the opening of nozzle 23 varies the output air pressure of the turbosupercharger 12, thereby varying the manifold pressure of engine 10 and also varying indirectly the amount of fuel supplied to engine 10. This varies the output of engine 10, while the thrust produced by nozzle 23 is also varied because of the resulting change in flow of exhaust gases.

Variable discharge nozzle 23 is constructed so that its eyelids cannot close completely under any circumstances so that it is impossible for the boost control system to completely stop the engine. Nozzle 23 may be arranged, for example, so that it will close only to approximately 20% of its fully open cross sectional area.

Changes in the position of the eyelids of nozzle 23 may be effected by unbalancing a simple bridge circuit, indicated generally at 30, which forms a part of the boost control system. A transformer 31, energized at terminal 32 from the airplane's 400 cycle power system, supplies voltage to the bridge which comprises a potentiometer resistor 33 and a potentiometer resistor 34 connected in parallel. The potentiometers are provided with sliding wipers 35 and 36 respectively. Wiper 36 is pivoted at 37 and is also connected to ground potential at this point. The upper wiper 35, which is operated by a control lever 42, may be referred to as the pressure boost selector.

When both wipers contact corresponding points on their respective resistors, they are at the same potential, and under these conditions the bridge 30 is in balance. However, when the upper wiper 35 is moved toward the left, its potential fluctuates in phase (or in step) with the left end of resistor 33. Likewise, when wiper 35 is moved toward the right, its potential fluctuates in phase with the right end of the resistor. The amplitude and sense of voltage fluctuations of wiper 35 with respect to the grounded wiper 36 are directly proportional to the distance and direction it is moved with respect to the grounded wiper. When such movement occurs, the bridge is unbalanced.

In the embodiment of the invention shown in the drawing, I have shown, by way of example, an absolute pressure responsive device which unbalances the bridge 30 in response to changes in pressure at the inlet of the throttle and fuel metering device by moving wiper 36. This pressure responsive device comprises an evacuated bellows 38 secured at its right end to a fixed support 39 and another bellows 40 connected at its left end by a pipe 41 to duct 15. The adjacent ends of the bellows are rigidly joined and are connected to wiper 36.

The pilot of the aircraft may unbalance bridge 30 by adjusting the position of control lever 42, which moves the boost control selector 35 so that it does not correspond with the inlet pressure to the throttle and fuel metering device. This causes a so-called "error signal" to be established between wiper 35 and ground, which signal is utilized, as will be seen, to reposition the eyelids of discharge nozzle 23. The error signal voltage is either in phase with the 400 cycle line voltage or 180 degrees out-of-phase with respect to the 400 cycle line voltage, depending upon whether the actual inlet pressure to the throttle and fuel metering device is above or below that selected by the pilot.

An error signal voltage established at bridge 30 travels through a voltage limiter 43, an adder network 44, a bias circuit 45, and a preamplifier and driver 46 to push-pull amplifier 29, from which it emerges as an amplifier signal and is applied to the motor 25, thus causing nozzle 23 to be repositioned and the inlet pressure to the throttle and fuel metering device to be readjusted by the turbosupercharger to the desired value. When the pressure in duct 15 at the inlet to the throttle and fuel metering device is lower than the pressure selected by the pilot, motor 25 operates to open nozzle 23. When the pressure in duct 15 is higher than the selected pressure, the opposite occurs, that is, motor 25 operates to close nozzle 23.

Under certain conditions of operation, particularly at high altitudes, the speed of turbine 21 may increase until it eventually becomes necessary to prevent the turbine from exceeding its maximum allowable safe speed. To accomplish this, the boost control system is provided with an overspeed circuit comprising a generator 47 directly connected to the turbine shaft so as to rotate at a speed directly proportional to that of the turbine. Generator 47 may be of the permanent magnet type to provide an alternating output voltage whose frequency varies with the speed of rotation. Its output is passed through a tuned circuit 48 to increase the slope of the voltage speed curve in the region of the overspeed point, thereby making the overspeed control system more sensitive when the turbine wheel approaches its maximum speed. Current from the tuned circuit 48 is converted to unidirectional current by a rectifier 49 and the resulting unidirectional voltage is utilized as a variable bias voltage to control the operation of voltage limiter 43.

The voltage limiter 43 comprises essentially a peak clipping circuit for controlling the amplitude of the pressure error signal directed through it to the nozzle operating motor 25. The degree of clipping varies in accordance with the degree of bias voltage applied to limiter 43 from the output of rectifier 49. Normally, a source of reference voltage 50 is provided to bias limiter 43, the voltage of reference 50 being of such magnitude that signals passing through limiter 43 normally remain substantially unchanged. However, when the turbine approaches its maximum speed and the overspeed circuit greatly supplements the bias on limiter 43 from reference source 50, the pressure error signal is reduced substantially to zero, thus enabling the subsequent bias circuit 45 to take over and close the nozzle 23 sufficiently to prevent the turbine speed from exceeding a safe value.

In order to insure prompt response and flexibility of control in preventing turbine overspeed, a fixed alternating current signal voltage tending to close variable discharge valve 23 is impressed on preamplifier 46 at all times by bias circuit 45. This fixed signal may be counterbalanced at bridge 30, preferably by the calibration of boost selector 35, so that the resulting signal to the valve motor 25 is algebraically zero when no change in pressure is called for. It will be evident that if the pressure error signal is reduced below the value of counter-balancing voltage at bridge 30, either by the action of the overspeed circuit, or because of circuit failure, valve 23 will automatically travel to the closed position, that is, to the maximum closed position permitted by the construction of the valve. It will also be apparent that the overspeed circuit automatically over-rules further demand for valve opening once the maximum safe turbine speed has been attained.

Due to delays in the responses which produce the actual pressure change at the inlet of the throttle and fuel metering device 17, the controls of the system thus far described would tend to hunt and produce an undesirable fluctuating pressure, unless means were provided to overcome this unstability. I, accordingly, provide in my invention novel means for combating unstability by providing transient anticipatory signals to warn the nozzle eyelid operating motor of its approach to the position which will satisfy the demand for a change in pressure. These anticipatory signals, after being inserted in the control system, are slowly washed out electronically, after a change in nozzle position has been effected, so that no permanent droop is created in the regulation curve of the turbine.

Referring to Fig. 1 of the drawing, I provide means for obtaining a signal responsive to changes in the position of nozzle 23 by connecting the gear train 26 to a wiper 51 which moves along a potentiometer resistor 52. Resistor 52 is connected at one end 53 to a suitable source of unidirectional voltage and at the other end 54 to ground potential. Thus, the potential of wiper 51 is a value intermediate the potential at point 53 and ground potential. The nozzle position signal, derived from wiper 51 by the movement thereof, is fed to a time constant circuit 55, the output of which is fed to a chopper circuit 56.

In order to obtain an additional signal responsive to changes in the speed of turbine 21, the voltage output of generator 47, in addition to being connected to tuned circuit 48, is fed through a rectifier 57 to a second time constant circuit 58. The output of time constant circuit 58 is, in turn, fed to chopper circuit 56.

The chopper circuit 56 converts the combined unidirectional transitory voltages of time constant circuits 55 and 58 to an alternating voltage which is combined with the pressure error signal in adder network 44 after being passed through an amplifier 59. The chopper circuit output voltage is of the same frequency as the line, it being connected by a cable 60 to the airplane's 400 cycle system, and is either in phase with the error signal voltage or 180 degrees out-of-phase with the error signal voltage, depending upon the polarities of the voltages from the time constant circuits, and from a lead-lag network 62 which is discussed in detail subsequently.

Two time constant circuits are used so that the time constant for the nozzle position change signal can be of a different value than the time constant of the speed change signal from generator 47. Preferably, the time constant of the position stabilizing circuit is made considerably longer than that of the speed stabilizing circuit. When only a small pressure change occurs, the position stabilizing circuit provides all the stabilizing action that is required, but when a large change occurs, the use of the position stabilizing circuit alone might produce hunting. This is because the temporary position signal will be almost completely decayed before the desired operating position of the nozzle is reached.

In order to counteract this tendency, the speed stabilizing circuit is provided. This circuit does not come into effective operation until a comparatively long time after the original error signal, calling for a pressure increase, for example, has been introduced, because of the time delay inherent in accelerating the turbine. When the turbine acceleration finally does cause generator 47 to produce a sufficient signal to overcome the short time constant of circuit 58, the nozzle eyelids are caused to move in the closed direction momentarily until the position stabilizing circuit takes over again, after which the eyelids quickly come to rest. This movement of the eyelids occurs just before the original error signal voltage has decayed to zero so that equilibrium is once again established.

To provide for further stabilization of the control system, an additional follow-up circuit is used for the stabilization of the motor servo loop portion of the boost control system, which includes push-pull amplifier 29 and motor 25. This additional stabilizing circuit includes a phase sensitive rectifier or discriminator circuit 61 and a lead-lag network 62. The alternating voltage output of amplifier 29 is fed into the phase sensitive rectifier 61, which produces a unidirectional voltage responsive in sense and magnitude to the alternating voltage which is supplied to motor 25. The unidirectional voltage output of rectifier 61 is fed into the lead-lag network 62, which produces a transient decaying voltage whose initial value is responsive to the magnitude of the voltage applied to motor 25. This network is referred to as a lead-lag network because it includes a filter circuit which inherently introduces a lag, together with a lead producing circuit having components which insure that the ultimate output of the network is instantaneously responsive to changes in the output of amplifier 29.

The unidirectional transitory output voltage of network 62 is fed into chopper circuit 56 where it is converted into a corresponding alternating voltage, which, after being amplified, is combined degeneratively with the error signal in adder network 44. The effect of the anticipatory signal produced by network 61, 62 is to counteract the error signal voltage to reduce the voltage applied to the motor 25 to essentially zero when the error signal voltage is very small. This means that small momentary changes in the error signal do not cause motor 25 to operate, thus aiding materially in reducing hunting. When a large error voltage is present, the motor is permitted to run at full speed because the feedback voltage is then overpowered. Also, the motor is ultimately permitted to run at full speed very soon after an error voltage of any substantial magnitude is applied because the feedback voltage is quickly washed out in the lead-lag network.

In the selection of the throttle regulator 24 for my novel engine control system, I choose a regulator having a pressure schedule curve similar to that of the boost control system so that it is possible for a pilot to control power plant operation from a single control lever. This is illustrated in Fig. 2 of the drawing in which curve A represents the schedule curve of the throttle regulator, while curve B represents the schedule curve of the boost control system. Curve A indicates the intake manifold pressure, corresponding to the position of the pilot's lever, that the throttle regulator attempts to maintain by varying the position of the throttle valve. If there is not sufficient pressure to satisfy the regulator, the throttle valve remains fully open. Curve B shows the throttle entrance pressure which the boost control system maintains at the inlet to the throttle and fuel metering device for various positions of the pilot's lever. It will be noted that curve A is slightly above curve B over the entire range, except for the lower portion. Here, the inlet pressure of the throttle and fuel metering device has a lower limit corresponding approximately to sea level atmospheric pressure and the schedule curve of the throttle regulator drops below curve B. Over the remainder of the operating range, however, curve A is above curve B, which means that the throttle remains fully open at all times under ordinary flight conditions.

Curve C in Fig. 2 represents the actual position of the throttle valve corresponding to the various positions of the pilot's control lever, while curve D represents the closing limit of the throttle valve beyond which it is mechanically impossible for the throttle to go. It will be readily understood by those skilled in the art that the limit represented by curve D is necessary to provide for engine starting, to prevent the throttle from being suddenly closed completely, and for other reasons of safety, and that all conventional throttle regulators include this feature.

There is shown in Fig. 3 of the drawing a schematic diagram of a typical throttle regulator and a typical fuel metering device suitable for use in the aircraft power plant control apparatus disclosed herein. These devices and other associated parts bear the same reference numerals in this figure as in Fig. 1. As shown in Fig. 3, the throttle regulator 24 comprises a hydraulic cylinder 70 having a piston 71 connected for the operation of throttle valve 17a through a piston rod 72 and a lever arm 73 connected to the throttle valve. Piston 71 is operated to the right or left to move throttle 17a toward its closed and opened positions respectively, by means of a hydraulic relay device 74 having a slidable operating member 75 operated by a rod 76. The latter is connected for operation by a pivoted member 77 which is acted upon by two forces, one due to a tension spring 78 and another due to the pressure differential created by a bellows 79 and an evacuated bellows 80. This throttle regulator operates to maintain a predetermined throttle valve position depending upon the position of control lever 42, the position of this control lever determining the tension in spring 78. Assuming, for example, that the pilot's control lever 42 is moved clockwise thereby increasing the tension on spring 78, lever 77 will be rotated clockwise which will move the rod 76 and operating member 75 of relay device 74 to the left. This will admit oil or other hydraulic fluid on the right side of piston 71 and rotate throttle valve 17a counter-clockwise, thereby increasing the opening of the throttle valve. The increased opening of the throttle valve will increase the pressure in duct 18 from which a pressure transmitting line 98 is connected to bellows 79. The resulting increase in pressure in bellows 79 tends to restore lever 77 to its initial position and thereby attempts to restore the throttle regulator to equilibrium. Throttle valve 17a would thus normally be maintained at a position corresponding to the pressure selected by pilot's control lever 42 to provide a selected manifold pressure as indicated by the curve A of Fig. 2 if it were not for the boost control system which prevents such action during normal operating conditions of the aircraft power plant control system. There is also shown as a portion of the throttle regulator of Fig. 3 a connection between control lever 42 and a cam 81 which provides the minimum throttle valve closing position corresponding to curve D of Fig. 2. Due to the mechanical connection between control lever 42 and cam 81, there is provided a lower limit of throttle closing corresponding to the throttle lever position which is independent of the action of either the throttle regulator 24 or the boost control system.

There is also shown in Fig. 3 a fuel metering device which is suitable for use with the system disclosed herein. As shown schematically, this device comprises four pressure chambers 82, 83, 84 and 85. Chambers 82 and 83 are separated by a flexible diaphragm 86, and chambers 84 and 85 are separated by flexible diaphragm 87, while chambers 83 and 84 are separated by fixed wall member 88. Elongated slidable member 89, having a fixed connection with diaphragms 86 and 87 and a slidable connection with a wall 88, is positioned centrally of the device as shown in Fig. 3. Two pressures derived from the air flow through the air inlet duct to the internal combustion engine are applied to chambers 82 and 83. The pressure in chamber 82 varies approximately directly with the velocity in the air of duct 15, this pressure being derived through a tube 90 which has its inlet positioned so that the air stream impinges directly on it. The pressure in chamber 83 varies non-linearly with the velocity of the inlet air stream inasmuch as this pressure is derived from a tube 91 which is connected to a Venturi tube 92 in the duct 15. Thus, there is a pressure differential between chambers 82 and 83 which is dependent upon the velocity and hence varies with the volume or weight of air flow into the manifold of engine 10. Chamber 85 of device 17 receives fuel under pressure from the engine fuel pump when the shoulder portion of chamber 89 is separated from its seat against wall 93 of the device. From chamber 85, fuel passes through a connection 84 having therein an orifice 95 to the fuel injection pump or pumps for the cylinders of engine 10. The size of orifice 95 is set by the pilot's mixture control lever (not shown). The outlet from orifice 95 communicates with chamber 94, thus providing a pressure differential between chambers 84 and 85 which is dependent upon the amount or weight of fuel flow through orifice 95 to the fuel injection pumps and into the engine cylinders. In the operation of device 17, the pressure differential between chambers 82 and 83 acting through diaphragm 86 balances the pressure differential between chambers 84 and 85 acting through diaphragm 87 and maintains a weight of fuel flow to engine 10 which is responsive to the weight of combustion air entering the intake manifold.

During normal flight operation, the throttle remains fully open and the entire power plant, including engine 10, is governed completely by the boost control system. When the pilot's lever is moved close enough to the zero position that curve A drops below curve B, then the position of the throttle valve changes in accordance with curve C to maintain the intake manifold pressure in accordance with curve A, with the throttle gradually closing as the pilot's control lever approaches the zero point.

In order to prevent the air pressure output of the turbosupercharger from exceeding the desired maximum pressure limit during emergencies such as a failure of the electrical control system, for example, I provide relief valve 16, previously mentioned. This valve is of the spring loaded pop-off type and is provided with an evacuated bellows 64 having approximately the same effective cross sectional area as the area of the valve seat, so that regardless of altitude the relief valve operates at the same absolute pressure. The biasing spring 63 may be conveniently located within the bellows 64, if desired. When the pressure within duct 15 gets sufficiently high, the bias of spring 63 is overcome and member 65 leaves the valve seat and releases air to the atmosphere.

It will be understood that as the air pressure output of the turbosupercharger increases abnormally above the normal operating range, the throttle valve is immediately operated as soon as the intake manifold pressure exceeds curve A. This is effective only to a limited extent, however, in counteracting an abnormal pressure rise because of the lower limit of throttle closing, as illustrated by curve D. Furthermore, if the output of a centrifugal compressor is throttled too much, a surge condition is encountered under which the pressure oscillates violently from one extreme to the other, and this provides another limit on the amount of throttling by valve 17a.

In order to surmount these obstacles and keep the power plant operating under emergency conditions such as the failure of the electrical control system, I provide valve 16 which opens and releases air to the atmosphere when the pressure in duct 15 reaches a predetermined absolute value. Valve 16 is so chosen that it is easily capable of releasing sufficient air to the atmosphere to prevent the building up of enough air pressure to damage the engine and at the same time to prevent the turbine from running away. Since the air which passes into the internal combustion engine ultimately reaches the turbine in the form of exhaust gases, the release of sufficient air from the induction line causes the turbosupercharger to reach an equilibrium operating condition at which the power supplied by the turbine equals the load created by the compressor, which means that the turbine speed does not increase further and it is prevented from running away.

It may be pointed out that single lever control, as provided by this invention, is particularly advantageous for a power plant of the type illustrated in Fig. 1 which has no gear driven supercharger to supplement the action of the turbosupercharger. When a gear driven supercharger is used, there is some supercharging action present whenever the reciprocating engine is running, regardless of the condition of the turbosupercharger. Thus, it is possible to operate the internal combustion engine at reduced power without using the turbosupercharger at all. When there is no gear driven supercharger, however, the turbosupercharger must be operated in order to operate the internal combustion engine. Therefore, it is important to provide a control system which provides for operation of the complete engine and turbosupercharger unit by means of a single control lever.

While I have illustrated and described a preferred embodiment of my invention, modifications thereof may be made by those skilled in the art and, therefore, it should be understood that I intend to cover, by the appended claims, any such modifications which fall within the true spirit and scope of my invention.

What I claim as new and desire to secure by Letters Patent of the United States is:

1. In a power plant having an internal combustion engine for providing the primary source of power, an exhaust gas driven turbosupercharger, and a variable nozzle for controlling the flow of exhaust gases to provide a supplementary source of power in the form of a jet thrust, a control system comprising a throttle valve in the air supply duct connecting said turbosupercharger and the intake manifold of said engine, a control lever, means for maintaining a preselected throttle entrance pressure in said air supply duct comprising means responsive to changes in turbosupercharger pressure for producing an electrical error signal proportional to the difference between said throttle entrance pressure and a preselected pressure corresponding to the position of said control lever, means responsive to said error signal for positioning said nozzle to maintain said preselected pressure, electrical stabilizing means connected to said error signal responsive means for generating a transient anticipatory signal, network means connected to receive and add said anticipatory signal in opposition to said error signal, and throttle regulator means controlled by said control lever for positioning said throttle valve responsively to the engine manifold pressure, said throttle regulator means providing higher pressure values than said throttle entrance pressure maintaining means for a selected range of control lever positions in the normal operating range of said control system whereby said throttle valve is maintained fully open during normal operation.

2. In a power plant having an internal combustion engine provided with an exhaust driven turbosupercharger, a valve for controlling the flow of exhaust gas through the turbosupercharger, a control lever, a throttle valve in the induction air duct connecting said turbosupercharger to the intake manifold of said engine, a throttle regulator controlled by said control lever for positioning said throttle valve responsively to the intake manifold pressure of said engine, means responsive to the flow of air through said throttle valve for supplying fuel to said engine, and a boost control system responsive to the air pressure between said turbosupercharger and said throttle valve, said boost control system comprising means for deriving an electrical error signal responsive to changes between said air pressure and a preselected pressure corresponding to the position of said lever, and electrical means responsive to said error signal for positioning said valve to vary the output of said turbosupercharger and thereby maintain said preselected throttle entrance pressure, said boost control system providing pressure values lower than said throttle regulator for a selected range of control lever positions in the normal operating range of said control apparatus whereby said throttle valve is maintained fully open by said throttle regulator during normal operation.

3. In a reciprocating engine having an exhaust driven turbosupercharger adapted to utilize substantially all the exhaust gas produced by said engine, said turbosupercharger being provided with a variable nozzle on the outlet of the turbine portion thereof for controlling the output of said turbosupercharger, and an air supply duct connecting the compressor portion of said turbosupercharger to the intake manifold of said engine, the combination of a control lever, a throttle valve in said supply duct, a hydraulic regulator connected to said control lever for positioning said throttle valve responsively to the manifold pressure and the position of said lever, and a boost control system responsive to the pressure in said supply duct upstream from said throttle valve, said boost control system comprising electrical means connected to said lever for deriving an error signal responsive to the difference between said supply duct pressure and a preselected pressure corresponding to the position of said lever, and electrical means responsive to said error signal for positioning said turbosupercharger discharge valve to maintain said supply duct pressure at said preselected value.

4. In a supercharging and control system for an internal combustion engine, a supercharger driven by an exhaust gas turbine, a valve for controlling the exhaust gas flow through said turbine, positioning means for said valve, electrical control means comprising means for sensing the pressure of air supplied by said supercharger, bridge means for deriving an alternating error voltage proportional to the difference between the sensed pressure and a selected pressure, alternating current generator means connected to said turbine for restricting the error voltage when said turbine approaches a predetermined speed, a first stabilizing circuit including said generator means for producing a first stabilizing voltage in phase opposition to said alternating error voltage, said first stabilizing circuit comprising rectifier means connected to said generator means and a time constant circuit connected to said rectifier means for providing a transient voltage having a predetermined time constant, a second stabilizing circuit responsive to the position of said valve for producing a second stabilizing voltage in phase opposition to said alternating error voltage, said second stabilizing circuit comprising a potentiometer operated by said valve positioning means and a time constant circuit having a longer time constant than the time constant circuit included in said first stabilizing circuit for providing a second transient voltage, network means for combining said two transient voltages, means for converting the combined voltage to an alternating voltage, means for combining said converted voltage with said error signal in opposition thereto, means for amplifying the difference between said error signal and said converted voltage, and means for operating said valve positioning means in response to said amplified voltage.

5. An apparatus for controlling the pressure of combustion air supplied to an internal combustion engine comprising an exhaust gas driven turbosupercharger, a variable nozzle for controlling the flow of exhaust gases driving the turbosupercharger, means responsive to changes in the air pressure supplied by said turbosupercharger for producing an error signal voltage proportional to the difference between the pressure of air discharged from said turbosupercharger and a preselected pressure, motor means for the operation of said nozzle, amplifier means responsive to said error signal voltage for operating said motor means and said nozzle to maintain said preselected pressure, means for deriving a first transient stabilizing voltage responsive to changes in the output voltage of said amplifier means, a stabilizing circuit including a generator driven by said turbosupercharger for providing a second transient stabilizing voltage responsive to changes in the speed of said turbosupercharger, a stabilizing circuit responsive to changes in the position of said nozzle for producing a third stabilizing voltage, network means for combining said three stabilizing voltages, and means for applying said combined voltages in opposition to said error signal voltage so that only the difference between said error signal voltage and said combined voltages is available for actuating said amplifier means.

6. An apparatus for controlling the pressure of combustion air supplied to an internal combustion engine comprising an exhaust gas driven turbosupercharger, a variable nozzle for controlling the flow of exhaust gas, means responsive to changes in the air pressure supplied by said turbosupercharger for producing an error signal voltage proportional to the difference between the discharge pressure and a preselected pressure, motor means for the operation of said nozzle, amplifier means responsive to said error signal for operating said motor means and said nozzle to maintain said preselected pressure, means for deriving a transient anticipatory voltage responsive to changes in the output voltage of said amplifier means, a generator driven by said turbosupercharger, a time constant circuit connected to said generator for providing a first transient stabilizing voltage responsive to changes in the speed of said turbosupercharger and having a predetermined time constant, a second stabilizing circuit responsive to changes in the position of said nozzle for producing a second transient stabilizing voltage, said second stabilizing circuit including a second time constant circuit having a different time constant than said first time constant circuit, network means for combining said anticipatory voltage and said two stabilizing voltages, and means for applying said combined voltages in opposition to said error signal voltage in a manner such that said amplifier means is responsive only to the difference between said error signal and said combined voltages.

BRUCE A. WELLS.

(References on following page)

References Cited in the file of this patent

UNITED STATES PATENTS

| Number | Name | Date |
|---|---|---|
| 1,959,298 | Levy et al. | May 15, 1934 |
| 2,233,415 | Hull | Mar. 4, 1941 |
| 2,356,557 | Anxionnaz et al. | Aug. 22, 1944 |
| 2,372,250 | Burnelli | Mar. 27, 1945 |
| 2,447,388 | Baak | Aug. 17, 1948 |
| 2,453,650 | Alexanderson | Nov. 9, 1948 |
| 2,462,456 | Bedford | Feb. 22, 1949 |
| 2,487,049 | Gille | Nov. 8, 1949 |
| 2,491,380 | Kutzler | Dec. 13, 1949 |
| 2,493,476 | Crum et al. | Jan. 3, 1950 |

FOREIGN PATENTS

| Number | Country | Date |
|---|---|---|
| 573,399 | Great Britain | Nov. 20, 1945 |